US011290402B2

(12) United States Patent
Nguyen et al.

(10) Patent No.: US 11,290,402 B2
(45) Date of Patent: Mar. 29, 2022

(54) MANAGING MESSAGE ATTACHMENTS

(71) Applicant: DROPBOX, INC., San Francisco, CA (US)

(72) Inventors: Huy Nguyen, San Francisco, CA (US); Anvisha Pai, San Francisco, CA (US); Brandon Souba, San Francisco, CA (US); Nikrad Mahdi, San Francisco, CA (US); Rajeev Nayak, San Francisco, CA (US); Anand Prakash, San Francisco, CA (US); Yang Zhang, San Francisco, CA (US); Yuyang Guo, San Francisco, CA (US); Erika DeBenedictis, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 180 days.

(21) Appl. No.: 15/283,188

(22) Filed: Sep. 30, 2016

(65) Prior Publication Data
US 2018/0097757 A1 Apr. 5, 2018

(51) Int. Cl.
| | |
|---|---|
| *H04L 12/58* | (2006.01) |
| *H04L 29/08* | (2006.01) |
| *G06F 16/182* | (2019.01) |
| *H04W 4/12* | (2009.01) |
| *G06Q 10/10* | (2012.01) |
| *H04L 51/08* | (2022.01) |
| *H04L 67/06* | (2022.01) |

(52) U.S. Cl.
CPC ............ *H04L 51/08* (2013.01); *G06F 16/182* (2019.01); *G06Q 10/107* (2013.01); *H04L 67/06* (2013.01); *H04W 4/12* (2013.01)

(58) Field of Classification Search
CPC .......... H04L 51/08; H04L 67/06; H04W 4/12; G06F 16/182; G06Q 10/107
See application file for complete search history.

(56) References Cited

U.S. PATENT DOCUMENTS

| | | | | |
|---|---|---|---|---|
| 5,706,510 A | * | 1/1998 | Burgoon | ................. G06F 16/10 |
| 8,185,591 B1 | * | 5/2012 | Lewis | ................. G06Q 10/107 |
| | | | | 358/1.15 |
| 8,316,438 B1 | * | 11/2012 | Bush | ....................... H04L 12/66 |
| | | | | 726/22 |
| 8,615,553 B2 | * | 12/2013 | Lucas | ...................... A61L 2/10 |
| | | | | 709/206 |

(Continued)

*Primary Examiner* — Thu V Nguyen
*Assistant Examiner* — Angela M Widhalm De Rodrig
(74) *Attorney, Agent, or Firm* — DLA Piper LLP (US)

(57) ABSTRACT

Disclosed are systems, methods, and non-transitory computer-readable storage media for managing email attachments in an online content management system. In some implementations, a messaging client can receive input attaching a content item to an electronic message in a message thread. In response to the input, the messaging client can store the content item in a file system managed by an online content management system, generate a link to the content item, and insert the link in the electronic message. The content item can be shared with the recipients of the electronic message such that the content item can be synchronized across recipient devices by the online content management system. The messaging client on each recipient device and/or the sender's device can present representations of the attachments associated with the message thread in a centralized location on a GUI of the messaging client.

17 Claims, 10 Drawing Sheets

(56) References Cited

U.S. PATENT DOCUMENTS

| | | | | |
|---|---|---|---|---|
| 8,826,148 B2* | 9/2014 | Yuniardi | G06Q 10/00 | 709/206 |
| 9,075,954 B2* | 7/2015 | Kirigin | G06F 21/00 | |
| 10,101,893 B1* | 10/2018 | van Doorn | G06Q 10/107 | |
| 2006/0069990 A1* | 3/2006 | Yozell-Epstein | G06Q 10/107 | 715/273 |
| 2007/0011258 A1* | 1/2007 | Khoo | G06F 3/0482 | 709/206 |
| 2007/0286575 A1* | 12/2007 | Oashi | G11B 20/00731 | 386/230 |
| 2011/0038002 A1* | 2/2011 | Nakamura | G06F 3/121 | 358/1.15 |
| 2011/0252098 A1* | 10/2011 | Kumar | G06Q 10/107 | 709/206 |
| 2012/0036370 A1* | 2/2012 | Lim | H04L 63/06 | 713/189 |
| 2012/0078845 A1* | 3/2012 | Kasbekar | G06Q 10/107 | 707/640 |
| 2013/0218829 A1* | 8/2013 | Martinez | G06Q 10/10 | 707/608 |
| 2013/0275429 A1* | 10/2013 | York | G06Q 50/01 | 707/737 |
| 2013/0339474 A1* | 12/2013 | Picker | H04L 29/06489 | 709/217 |
| 2014/0032713 A1* | 1/2014 | Phan | H04L 67/06 | 709/217 |
| 2014/0046976 A1* | 2/2014 | Zhang | G06Q 30/0255 | 707/772 |
| 2014/0067929 A1* | 3/2014 | Kirigin | H04L 67/06 | 709/204 |
| 2014/0114973 A1* | 4/2014 | Wetherell | G06Q 10/107 | 707/737 |
| 2015/0026604 A1* | 1/2015 | Mulukuri | H04L 51/32 | 715/758 |
| 2015/0134751 A1* | 5/2015 | Meyers, Jr. | H04L 51/08 | 709/206 |
| 2015/0186381 A1* | 7/2015 | Yan | G06F 16/14 | 707/728 |
| 2015/0200885 A1* | 7/2015 | Sharp | H04L 51/08 | 709/206 |
| 2015/0347368 A1* | 12/2015 | Carlen | G06F 17/241 | 715/230 |
| 2016/0028875 A1* | 1/2016 | Brown | G06F 3/0481 | 715/751 |
| 2016/0110669 A1* | 4/2016 | Iyer | G06Q 10/06315 | 705/7.25 |
| 2016/0142889 A1* | 5/2016 | O'Connor | H04W 4/21 | 705/44 |
| 2016/0219161 A1* | 7/2016 | Nakamura | H04N 1/00204 | |
| 2016/0259517 A1* | 9/2016 | Butcher | G06F 3/0482 | |
| 2016/0308840 A1* | 10/2016 | Munshi | H04L 63/0428 | |
| 2017/0041296 A1* | 2/2017 | Ford | G06F 16/951 | |
| 2017/0139557 A1* | 5/2017 | Heo | G06F 3/04817 | |
| 2017/0142042 A1* | 5/2017 | Bandi | H04L 51/08 | |
| 2017/0147600 A1* | 5/2017 | Brand | G06F 17/30165 | |
| 2017/0272388 A1* | 9/2017 | Bern | H04L 51/046 | |
| 2017/0308516 A1* | 10/2017 | Steplyk | G06F 17/241 | |

* cited by examiner

Review these documents please.

From: Dave Simpson

To: Robert Jones; Fred Smith

Hey Guys,

Please review the attached documents and send me your comments. Thanks!

Dave Simpson

Doc1
Doc2

Attachments

Doc1
Added by Dave Simpson
2 min ago

Fred Smith is viewing this

Doc2
Edited by You
3 min ago – Older versions

Reply

FIG. 5

MANAGING MESSAGE ATTACHMENTS

BACKGROUND

There are many electronic messaging technologies in use today. For example, while traditional email is still used to exchange electronic correspondence, other messaging technologies, such as SMS, instant messaging, chat messaging, etc., are becoming more and more popular. Most of these messaging technologies allow users to include attachments to messages. For example, colleagues may collaborate on a document by attaching the document to an email and exchanging different versions of the document as changes are made to the document. Exchanging attachments in this way can lead to confusion as to which version of the document is the current version and where different versions, or the official version, of the document is stored or managed. Thus, a better way to manage electronic message attachments is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing message attachments in an online content management system. In some implementations, a messaging client can receive input attaching a content item to an electronic message in a message thread. In response to the input, the messaging client can store the content item in a file system managed by an online content management system, generate a link to the content item, and insert the link in the electronic message. The content item can be shared with the recipients of the electronic message such that the content item can be synchronized across recipient devices by the online content management system. The messaging client on each recipient device and/or the sender's device can present representations of the attachments associated with the message thread in a centralized location on a GUI of the messaging client.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 5 illustrates an example graphical user interface for presenting status information for message thread attachments;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for managing message attachments. For example, typical messaging mechanisms (e.g., email, instant message, chat message, etc.) send message attachments (e.g., actual files, content items, etc.) along with the messages to message recipients. Attachments are frequently sent and resent as the messages are shared between users consuming computer resources (e.g., CPU cycles, memory, etc.) and network resources (e.g., bandwidth, data budgets, etc.). By storing and/or managing message attachments in a centralized location (e.g., by a content management system) and providing links to the stored attachments, these computing resources and networking resources can be conserved for other tasks.

Figure 1:
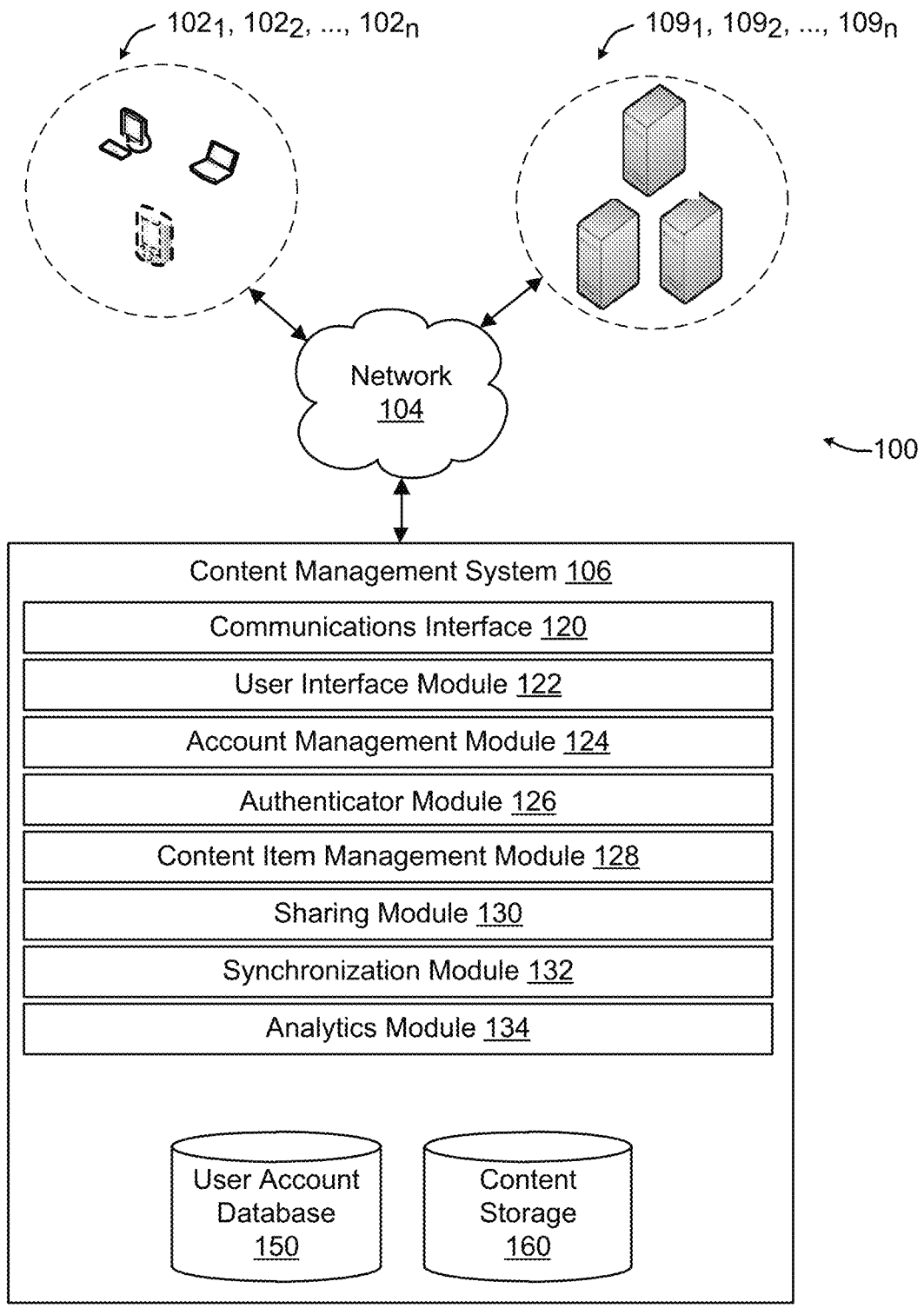
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2$, ..., $102_n$ (collectively "102") connected to network 104 by direct and/or indirect communication. Content management system 106 can include a single computing device (e.g., a server) or multiple computing devices (e.g., multiple servers) that are configured to perform the functions and/or operations that provide the services described herein. Content management system 106 can support connections from a variety of different client devices, such as: desktop computers; mobile computers; mobile communications devices, e.g. mobile phones, smart phones, tablets; wearable devices;

smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the content management system specific component can be a stand-alone application, one or more application plug-ins, and/or a browser extension. However, the user can also interact with content management system 106 via a third-party application, such as a web browser, that resides on client device $102_i$ and is configured to communicate with content management system 106. In various implementations, the client-side application can present a user interface (UI) for a user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g., various tiers of free or paid accounts), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, image files, video files, etc., from one or more client devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. Content storage 160 can store the metadata for a content item as part of the content item or separately from the content item. In some variations, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items with one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In some implementations of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection. The client software can provide notifications of synchronization operations, and can provide indications of content statuses directly within the content management application. Sometimes client device 102$_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content stored in a user account via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, ..., 109$_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides authentication credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include content item management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content item management module 128 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
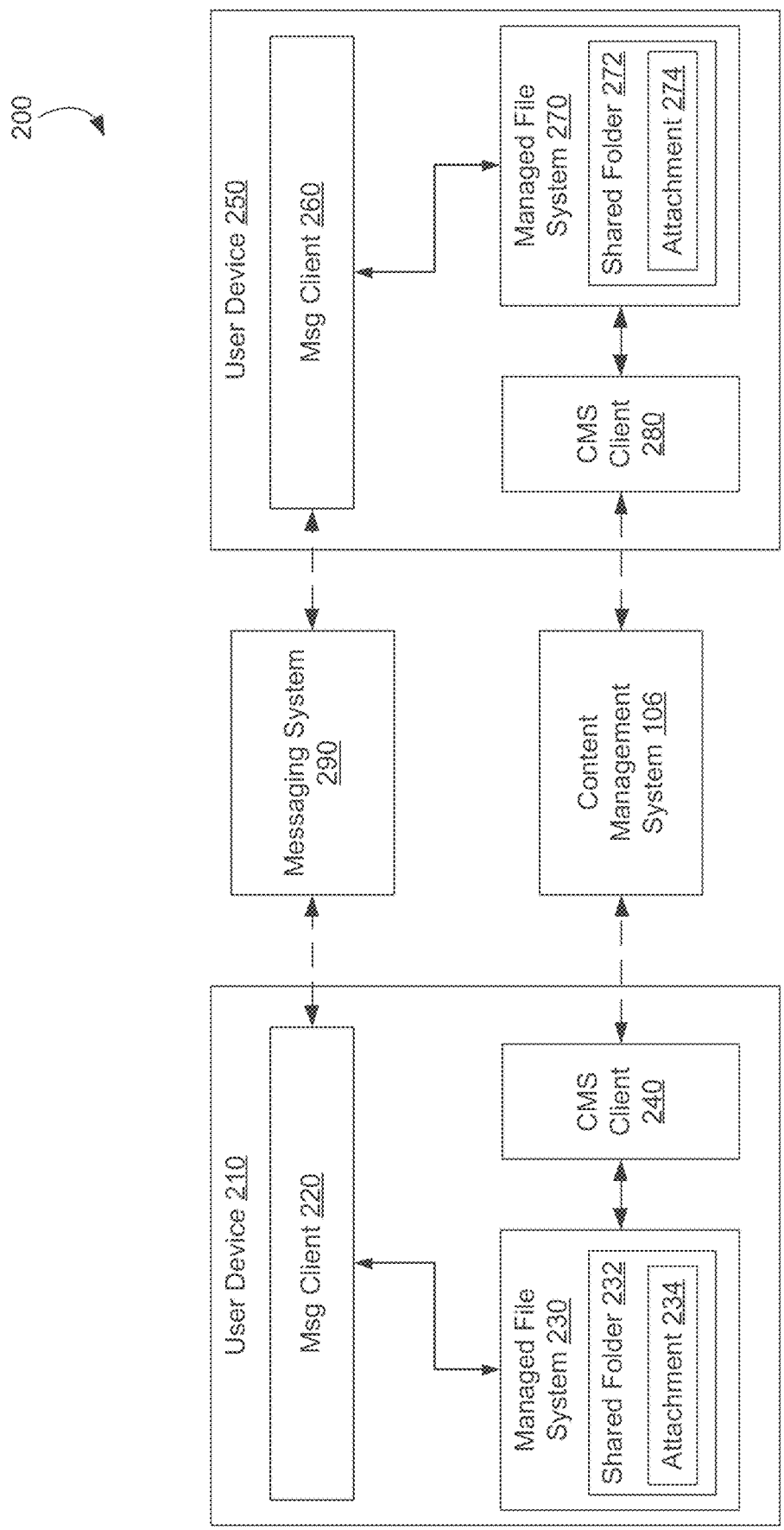
FIG. 2 is a block diagram of a system for managing message attachments in an online content management system.

FIG. 2 is a block diagram of a system 200 for managing message attachments in an online content management system. For example, system 200 can store message attachments as content items in content management system 106 and provide a centralized location within a graphical user interface (GUI) of a messaging client where a user can view all message attachments related to a message thread. Thus, system 200 can relieve the user of the burden of having to scan through messages in a message thread to find attachments and/or the desired version of a message attachment.

In some embodiments, system 200 can include user device 210. For example, user device 210 can correspond to client device $102_i$ of FIG. 1. User device 210 can, for example, include messaging client 220. For example, messaging client 220 can be a software application (e.g., a web browser, a native messaging application, etc.) that runs on user device 210. Messaging client 220 can be configured to send messages to and receive messages from other users of other user devices (e.g., user device 250) through messaging system 290. For example, messaging client 220 can be an email client, a text messaging client, a chat client, or any other type of messaging client.

In some implementations, messaging client 220 can be a software client of content management system 106. For example, if messaging client 220 is a web browser application, messaging client 220 can include a software module or plugin that allows messaging client 220 to access features, APIs, etc., of content management system 106. If messaging client 220 is a native messaging application, messaging client 220 can be built with features that allow messaging client 220 to interact with features, APIs, etc., of content management system 106.

In some implementations, messaging client 220 can generate electronic messages. For example, a user can interact with messaging client 220 to generate email messages, instant messages, text messages, and the like. Messaging client 220 can provide a user interface that the user can interact with to specify recipients of a message, a subject for the message, and/or content for the body of the message. The user may provide input to the user interface to specify attachments for the message. For example, the user may want to send a document, image, video, or other content items to the recipients of the message composed by the user. The user can select a content item for attaching to the message through a file browser interface provided by messaging client 220. The user can drag and drop a content item into the user interface of messaging client 220 to instruct messaging client 220 to attach the content item to the message. The user can type in a tagged content item identifier (e.g., "$Doc1") to cause messaging client 220 to attach a content item matching the tag. For example, the tag can be a prefix (e.g., "$") followed by a content item identifier (e.g., "Doc1"). When the tag is typed into the body of the message, messaging client can replace the tag with the content item identified by the tag.

In some implementations, user device 210 can include managed file system 230. For example, managed file system 230 can be a portion of the file system of user device 210 managed by content management system 106. Content items stored in managed file system 230 can be automatically uploaded to or synchronized with file systems in content management system 106 and/or managed file systems on other user devices (e.g., user device 250), as described above.

In some implementations, messaging client 220 can store the attachment in managed file system 230. For example, instead of attaching the content item to the message, messaging client 220 can store the selected content item (attachment 234) in managed file system 230, generate a link to the content item, and insert the link into the message. As used herein, an "attachment" can refer to a content item being associated with a message, e.g. via a link included with the message, without the substance of the content item being include in the message. When storing attachment 234, messaging client 220 can share attachment 234 with each of the recipients of the message so that the recipients can access attachment 234 through content management system 106. When the user attaches to the message a content item that is already managed by content management system 106 (e.g., already stored in managed file system 230), messaging client 220 can create a new version of the content item in managed file system 230, generate a link to the new version of the content item (e.g., representing the attached version of the content item), and store a linked content item (e.g., a content item that links or points to the new version of the content item) in the shared folder for the message thread. When the linked content item is selected by the user (e.g., in the shared folder, on a GUI of messaging client 220), the version of the content item corresponding to the linked content item can be presented by messaging client 220.

In some implementations, messaging client 220 can associate attachment 234 with a message or message thread. For example, messaging client 220 can insert a message thread identifier (e.g., an identifier that identifies a group of related messages) associated with the message into metadata for attachment 234. Later, when the user selects a message in a message thread, messaging client 220 can search managed file system 230 for content items (e.g., attachment 234) that are associated with the message thread identifier for the selected message thread and present the content items associated with the message thread in a graphical user interface of messaging client 220, as described further below.

In some implementations, messaging client 220 can store attachment 234 in shared folder 232 in managed file system 230. For example, when the user attaches a content item to a message in a message thread, messaging client 220 can generate shared folder 232 for the message thread where attachments to messages in the message thread can be stored. For example, the shared folder can be owned by the creator of the message thread (e.g., the creator of the first message in the message thread) and shared with each of the recipients of the messages in the message thread. As new recipients are added to the message thread (e.g., by forwarding a message to a new recipient, by replying to a message and adding a new recipient, etc.), the new recipients can be added as authorized users of shared folder 232. After creating shared folder 232, messaging client 220 can store attachment 234 in shared folder 232. For example, messaging client 220 can create or add shared folder 232 to managed file system 230 by invoking an API (application programming interface) of content management system 106 to cause content management system 106 to create the shared folder and synchronize the shared folder with managed file system 230 on user device 210. In some implementations, a previously established shared folder 232 can be selected for storing attachment 234 in managed file system 230. In some implementations, messaging client 220 can identify a shared folder based on the context of the message creation or specified recipient(s) of the message. For example, messaging client 220 can determine that the specified recipients include all the users in a group associated with a particular shared folder 232 and can select the particular shared folder 232 for storing attachment 234.

In some implementations, user device 210 can include content management system (CMS) client 240. For example, CMS client 240 (referred to as client software with reference to FIG. 1) can manage managed file system 230 for content management system 106. When messaging client 220 adds attachment 234 and/or shared folder 232 to managed file system 230, CMS client 240 can communicate with content management system 106 to synchronize the contents of managed file system 230 with content management system 106, as described with reference to FIG. 1 above. Similarly, CMS client 240 can monitor content items in managed file system 230 to determine when content items have been opened, modified, moved, etc., and which user has or is performing operations on the content items within managed file system 230. CMS client 240 can report this state information (e.g., an action performed, the user who performed it, timestamp for when the action was performed) to content management system 106 so that the state information can be shared with other users (e.g., the recipients of the message above) who are collaborating on the same content items.

In some implementations, content management system 106 can synchronize the contents of shared folder 232 with user devices (e.g., user device 250) associated with recipients of the message. For example, messaging client 220 can automatically share shared folder 232 with the recipients identified in the message being composed by the user of user device 210. When CMS client 240 synchronizes shared folder 232 with content management system 106, content management system 106 can determine which users of content management system 106 shared folder 232 has been shared with and automatically synchronize shared folder 232 with the determined users. Thus, if user device 250 is owned by a recipient in the message thread associated with shared folder 232, CMS client 280 on user device 250 will receive a synchronized copy of shared folder 232, now shared folder 272, in managed file system 270 on user device 250. Since shared folder 232 includes attachment 234, shared folder 272 on user device 250 will receive a copy of attachment 234, now attachment 274 on user device 250.

When the user of user device 210 is finished composing the message using messaging client 220, the user can provide input instructing messaging client to send the message to the designated recipients. Messaging client 220 can then send the message to messaging system 290 which can, in turn, send the message to messaging client 260 on user device 250. For example, user device 250 can correspond to a recipient of the message. User device 250 can be configured similarly to user device 210, for example.

In some implementations, messaging client 260 can present attachments stored in managed file system 270. For example, when the recipient user of user device 250 selects to view the message received from messaging client 220, messaging client 260 can determine a message thread identifier associated with selected message. Messaging client 260 can use the message thread identifier to determine content items (e.g., attachments, folders, etc.) stored in managed file system 270 related to the message thread. For example, messaging client 260 can use the message thread identifier to identify individual attachments (e.g., attachment 274) stored in managed file system 270 that are associated with the selected message. Messaging client 260 can use the message thread identifier to identify a shared folder (e.g., shared folder 272) that includes or contains attachments for the message thread. After identifying or locating the attachments for the message thread, messaging client 260 can present the attachments on a graphical user interface of messaging client 250, as described further below.

In some implementations, messaging client 260 can receive status updates for attachments or content items presented on the GUI of messaging client 260. For example, messaging client 260 can receive status updates for content items from content management system 106 indicating activities related to the content items performed by other users of content management system 106. For example, if another user opens, edits, moves, or otherwise interacts with a content item, content management system 106 can send this state change information, including activity performed, an identification of a user who performed the activity, and/or a timestamp representing when the activity was performed, to messaging client 260. Messaging client 260 can then present this state change information along with the content item on the GUI of messaging client 260, as described further below.

Figure 3:
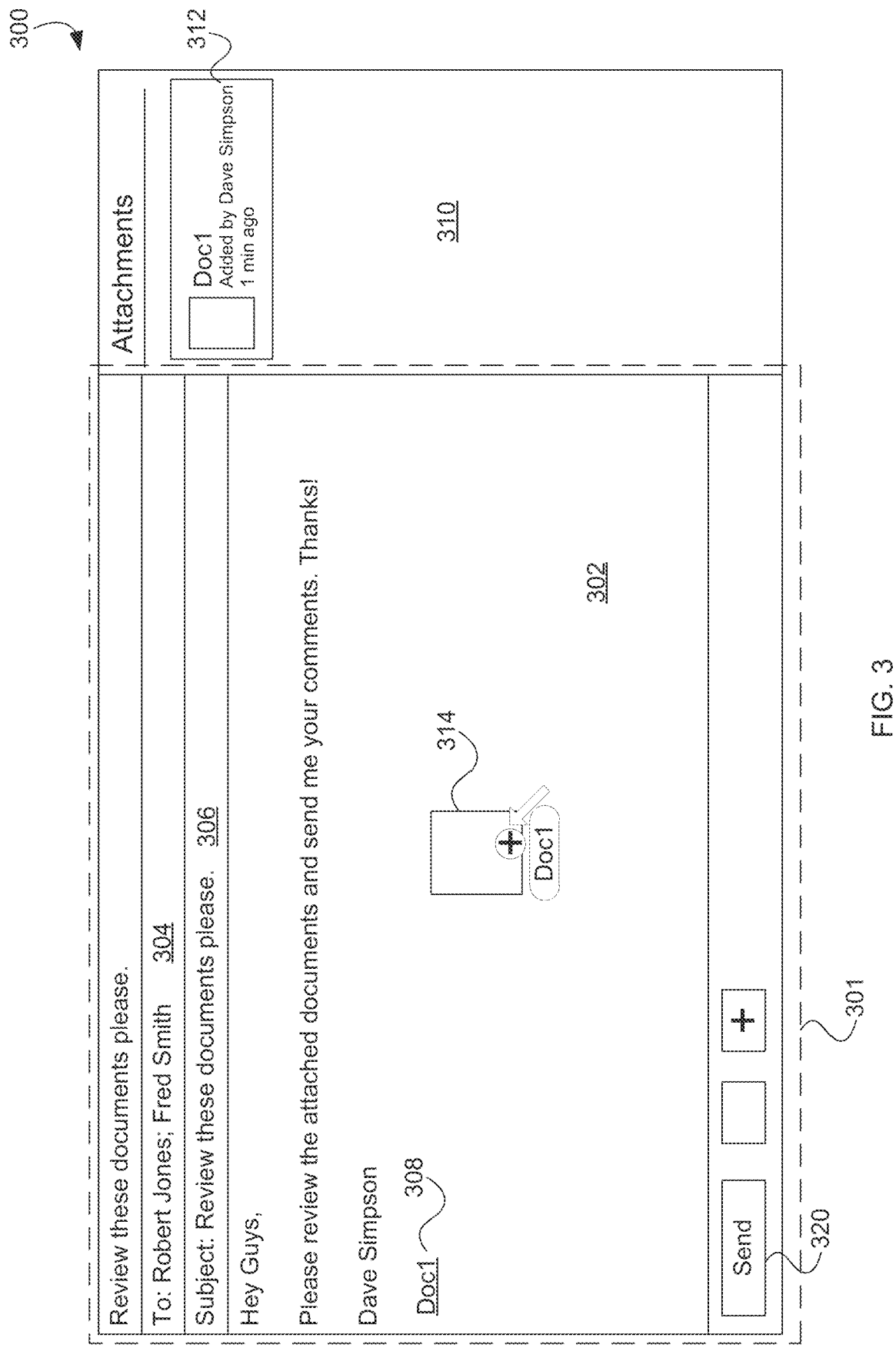
FIG. 3 illustrates an example graphical user interface for adding attachments to an electronic message.

FIG. 3 illustrates an example graphical user interface 300 for adding attachments to an electronic message. For example, graphical user interface (GUI) 300 can be presented by messaging client 220 and/or messaging client 260 of FIG. 2. While the graphical user interfaces described herein depict email user interfaces, the features described with reference to these GUIs can be easily applied to other electronic messaging GUIs and applications, as described above.

In some implementations, GUI 300 can include message composition area 301. For example, message composition area 301 can include the various GUI components used for composing the electronic message. For example, message composition area 301 can include input area 302 for composing the message body, input area 304 for specifying recipients of the message, and/or input area 306 for specifying a subject for the message. When the user creates a message using GUI 300, messaging client 220 can generate a message thread identifier for the message. For example, the message thread identifier can be based on the subject of the message specified by the user. For example, the message thread identifier can be a hash value generated based on the characters in the subject line.

In some implementations, GUI 300 can receive input selecting a content item to attach to the message being composed in GUI 300. For example, the user can select a graphical element (e.g., a button) to invoke a file browser from which to select a content item to attach to the message. The user can drag-and-drop a content item into message composition area 301 to attach the content item to the message. For example, the user can drag and drop graphical element 314 representing the content item labeled "Doc1" onto message composition area 301 to attach the corresponding content item to the message.

In some implementations, messaging client 220 can convert an attachment into a link. For example, instead of attaching the selected content item to the message and sending the content item with the message, messaging client 220 can store the selected content item in managed file system 230 (e.g., in shared folder 232), create a link (e.g., URL, hyperlink, etc.) to the content item, and insert the link into the body of the message. For example, messaging client 220 can insert link 308 referencing the content item attached to the message and stored in managed file system 230. Since messaging client 220 shares the stored content item or shared folder 232 with all of the message recipients, a recipient of the message can, for example, select the link to access and view the shared content item attached to the message.

In some implementations, GUI 300 can include attachment area 310. For example, attachment area 310 (e.g., a sidebar) can include representations of attachments (e.g., content items) associated with the message thread corresponding to the message currently displayed in GUI 300. For example, messaging client 220 can search managed file system 230 (or shared folder 232) for content items associated with the message thread corresponding to the message currently displayed by GUI 300. Messaging client can then present content items associated with the message thread (e.g., message thread identifier) in attachment area 310. For example, attachment area 310, and the content items therein, can be displayed separately from the messages presented on GUI 300 (e.g., in a GUI displayed using a separate application, which can be displayed in conjunction with or as an overlay on GUI 300). While a user is viewing any message in a message thread, attachment area 310 can present content items or attachments associated with the displayed message thread.

In some implementations, attachment area 310 can include graphical element 312 representing an attachment associated with the displayed message thread. For example, graphical element 310 can include a graphical representation of the corresponding content item or attachment. Graphical element 310 can include an identifier for the attachment. Graphical element 310 can include status information about the attachment. For example, the status information can indicate an action performed (e.g., added, edited, etc.) with respect to the attachment, the user who performed the action, and when the action was performed. The status information can be dynamically updated as users (locally or remotely) interact with the attachment. After composing the message, specifying recipients, and adding attachments, the user can select graphical element 320 to send the message to the designated recipients.

Figure 4:
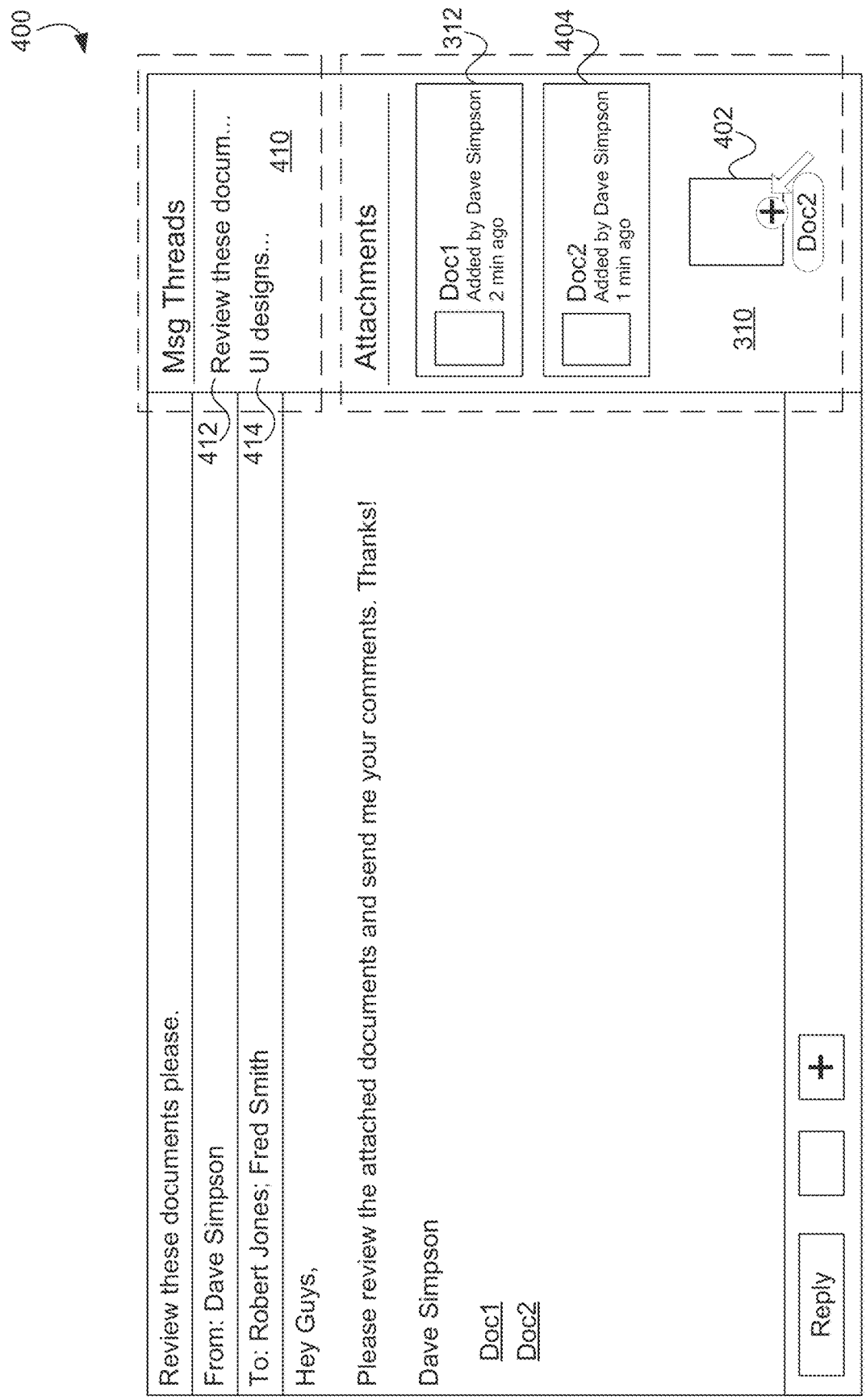
FIG. 4 illustrates an example graphical user interface for presenting message attachments in a messaging client.

FIG. 4 illustrates an example graphical user interface 400 for presenting message attachments in a messaging client. For example, GUI 400 can be a graphical user interface presented by messaging client 220. GUI 400 can be similar to GUI 300, for example. In some implementations, GUI 400 can include attachment area 310. Similar to GUI 300, attachment area 310 can be presented separately from message composition area 301.

In some implementations, a user can drag and drop content items into attachment area 310 to add attachments to the currently selected message thread. For example, a user can drag and drop graphical element 402 representing a content item into attachment area 310 to add the content item (e.g., "Doc2") to the message thread. When a user drops a content item into attachment area 310, the content item can be added to the shared folder for the message thread and/or tagged with the message thread identifier for the currently presented message thread and stored in managed file system 230. In some implementations, messaging client 220 can automatically generate a message in response to receiving a content item in attachment area 310. For example, messaging client 220 can automatically generate a message to all users (e.g., message recipients, message senders, etc.) associated with the message thread indicating that a new content item has been added to the message thread. After receiving the new content item (e.g., attachment), messaging client 220 can present a graphical element 404 representing the new content item in attachment area 310. For example, graphical element 404 can have the same or similar features as graphical element 312, described above.

In some implementations, a user can open an attachment by selecting graphical element 404. For example, messaging client 220 can receive user input selecting graphical element 404. In response to receiving the input, messaging client can open the corresponding content item (e.g., "Doc2") stored in managed file system 230. The content item can be opened locally in a native application on user device 210, for example. If the content item does not exist in the local file system, messaging client 220 can use a web browser to present a preview image of the content item stored remotely at content management system 106. For example, since the content items (e.g., attachments) are synchronized between user devices and content management system 106, content management system 106 can have a copy of the selected attachment that can be delivered to user device 210 and rendered for presentation to the user.

In some implementations, GUI 400 can include message thread area 410. For example, message thread area 410 can include selectable representations of message threads to which the user belongs. For example, a user may participate in multiple message threads. Each message thread that the user participates in can be represented by a selectable graphical element (e.g., graphical element 412, graphical element 414, etc.). The user can select a graphical element (e.g., graphical element 414) to cause messaging client 220 to present the message thread and the attachments corresponding to the selected message thread.

FIG. 5 illustrates an example graphical user interface 500 for presenting status information for message thread attachments. For example, GUI 500 can be presented by messaging client 220. GUI 500 can be similar to GUI 300 and/or GUI 400 described above. As described above, GUI 500 can include attachment area 310. Attachment area 310 can include graphical elements 312 and/or 404 representing attachments associated with the currently presented message thread.

In some implementations, GUI 500 can present status information for content items or attachments represented in attachment area 310. For example, GUI 500 can present graphical element 504 indicating that another user is currently viewing the content item represented by graphical element 312. Graphical element 504 can be dynamically presented when user "Fred Smith" opens or starts viewing the content item "Doc1", for example. Graphical element 504 can present other status information, such as who previously viewed the content item, who edited or modified the content item, who created the content item, and an indication of when each of these activities occurred. Graphical element 504 can be presented near, adjacent to, or abutting graphical element 312 to indicate that the status information pertains to the content item represented by graphical element 312.

Figure 6:
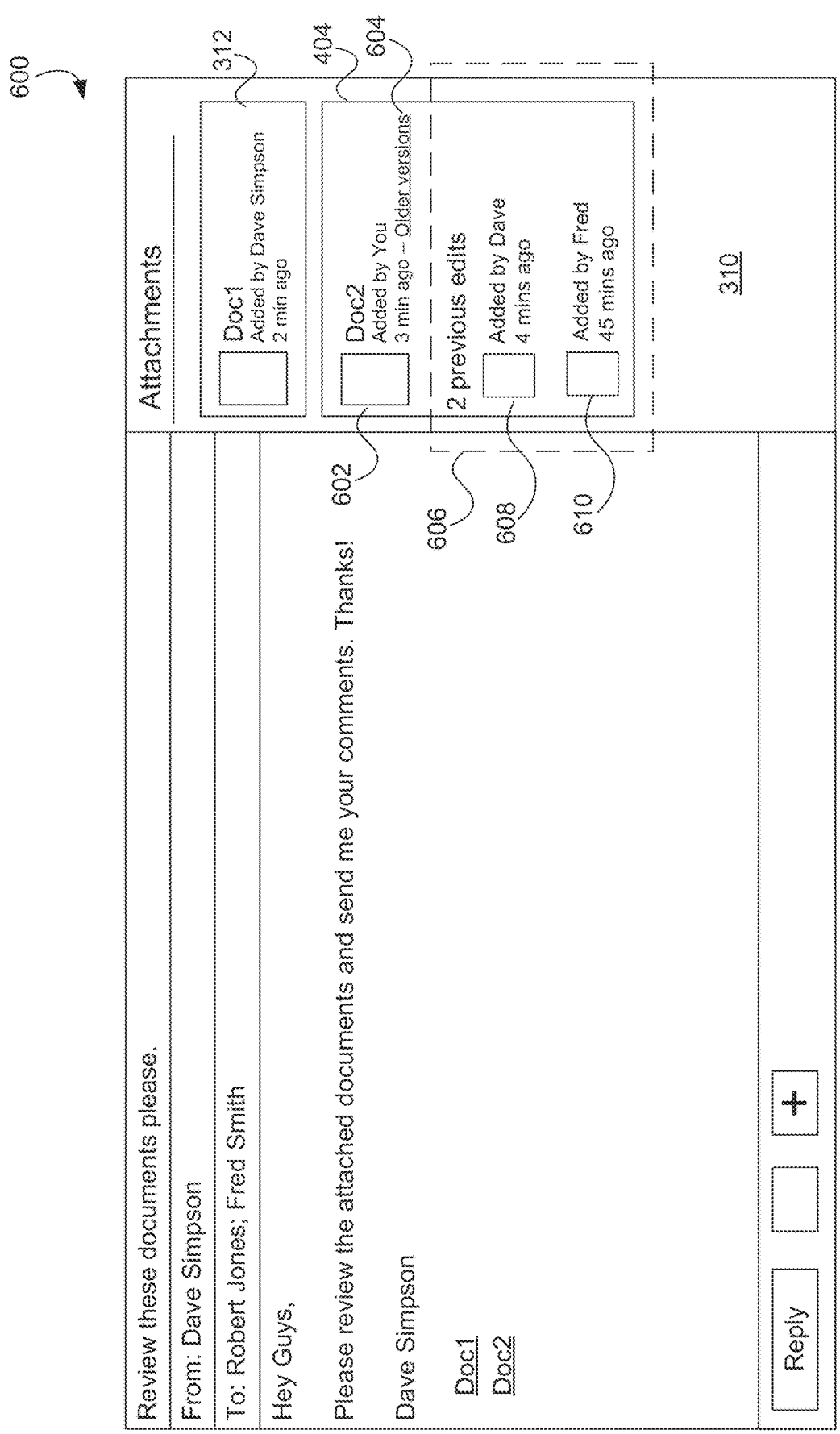
FIG. 6 illustrates an example graphical user interface for presenting version information for message thread attachments.

FIG. 6 illustrates an example graphical user interface 600 for presenting version information for message thread attachments. For example, GUI 600 can be presented by messaging client 220. GUI 600 can be similar to GUI 300, GUI 400, and/or GUI 500, described above. As described above, GUI 600 can include attachment area 310. Attachment area 310 can include graphical elements 312 and/or 404 representing attachments associated with the currently presented message thread.

In some implementations, GUI 600 can present version information for content items or attachments represented in attachment area 310. For example, graphical element 404 can present graphical element 604 indicating that older versions of the content item represented by graphical element 404 exist within content management system 106 and/or managed file system 230. For example, when messaging client 220 receives a selection of graphical element 312 or graphical element 602, user device 210 can present a current version of the corresponding content item on a display of user device 210.

If older versions of a content item exist, messaging client 220 can present graphical element 604 indicating that older versions of the content item "Doc2" exist within content management system 106. When messaging client 220 receives a user selection of graphical element 604, messaging client 220 can expand graphical element 404 to show a version history (e.g., in area 606) for the corresponding content item. In the example illustrated by FIG. 6, there are two previous versions of the "Doc2" content item and messaging client 220 has presented graphical elements 608 and 610 representing the two previous versions of the content item. When messaging client 220 receives a selection of graphical element 608 and/or graphical element 610, messaging client 220 can cause user device 210 to present the selected version of the content item.

As described above, embodiments described herein provide for a centralized place (e.g., user interface) where users associated with a message stream can access and manipulate a consistent set of content items (e.g., attachments). Users using the features described herein no longer have to search through individual messages to find attachments or versions of attachments. All attachments, and versions thereof, associated with the currently presented message stream are presented in the side tray GUI described above.

In some implementations, the functionality described herein is provided by a plugin or extension to a web browser. For example, the attachment side tray and the content management system functionality built into the side tray may be programmed into an extension loaded into the web browser. If the web browser does not have the appropriate extension installed, the side tray functionality can be provided as HTML embedded into each email. In some implementations, the functionality described herein can be provided by an application that is separate or distinct from the web browser. The separate application can present information and/or graphical elements as an overlay to the web browser graphical user interface, for example.

Figure 7:
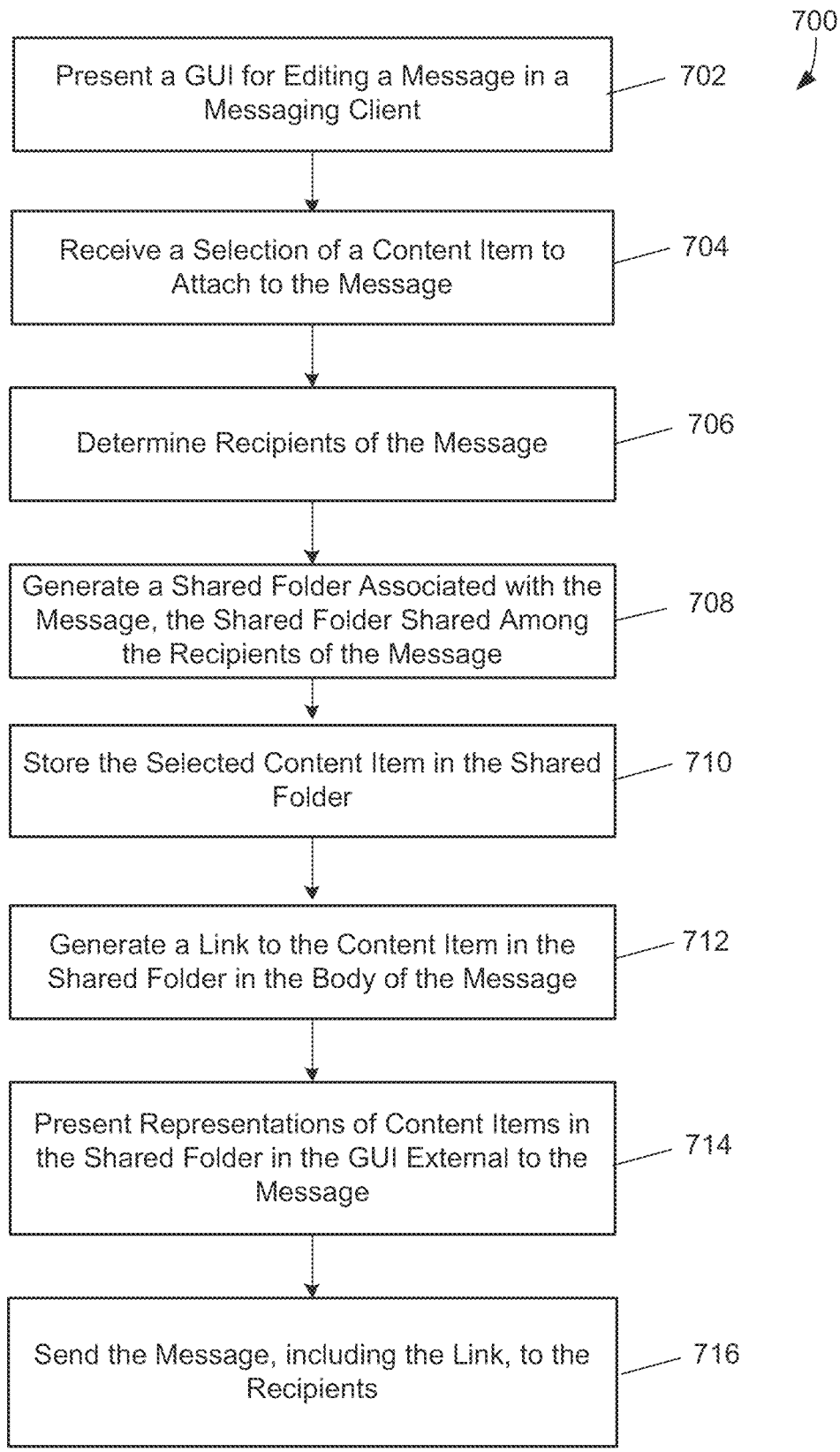
FIG. 7 is a flow diagram of an example process for storing message attachments in an online a content management system.

FIG. 7 is a flow diagram of an example process 700 for storing message attachments in an online a content management system. For example, process 700 can be performed by messaging client 220 on user device 210.

At step 702, user device 210 can present a graphical user interface for editing a message in a messaging client. For example, messaging client 220 can present an editing interface for generating and/or editing the message. The message can be an electronic message, such as an email, a text message, an instant message, a chat message, and the like.

At step 704, user device 210 can receive a selection of a content item to attach to the message. For example, messaging client 220 can receive a user selection of a content item using a file browser, a drag and drop action, and/or a tag embedded in the message, as described above.

At step 706, user device 210 can determine recipients of the message. For example, messaging client 220 can determine the recipients based on email addresses, telephone numbers, or other contact information inserted in a recipient field (e.g., "to" field, "CC" field, etc.) of the message.

At step 708, user device 210 can generate a shared folder associated with the message. For example, the message can be the first message in a message thread or a subsequent message in a message thread. When the message is the first message in a message thread, messaging client 220 can generate a shared folder for the new message thread for storing all attachments associated with the message thread. For example messaging client 220 or CMS client 240 can generate the shared folder by send a request to content management system 106 to cause content management system 106 to create a shared folder for the message. For example, the shared folder can be generated in the content management system account corresponding to the user who generated the message. The shared folder can be shared with each of the users identified as recipients of the generated message. If the message thread is later shared with additional users (e.g., new recipients are added), then the shared folder can also be shared with these additional users. When the message is a subsequent message in the message thread, messaging client 220 can store attachments to the subsequent message in the shared folder already created for the message thread (e.g., the shared folder created based on the initial message).

In some embodiments, a shared folder may not be used for managing attachments for a message thread. Instead, each message thread can have a message thread identifier and each attachment associated with the message thread can be tagged with the message thread identifier. When messaging client 220 later needs to determine which attachments belong to a message thread, messaging client 220 can search for attachments that have been tagged with the message thread identifier for the currently selected message thread, as described above.

At step 710, user device 210 can store the selected content item in the shared folder. For example, instead of attaching the selected content item to the message, messaging client 220 can store the selected content item in the shared folder generated at step 708.

At step 712, user device 210 can generate a link to the content item in the shared folder in the body of the message. For example, messaging client 220 can obtain a link (e.g., URL) to the content item stored in the shared folder and insert the link into the body of the message. In various implementations, user device 210 can include with the message the link to the content item instead of the content item or user device 210 can include the link to the content item in addition to attaching the content item to the message. By sending links instead of attachments, messaging client 220 can reduce the amount of network bandwidth needed to transmit the message.

At step 714, user device 210 can present representations of content items in the shared folder in the GUI of the messaging client. For example, when the user has selected a message thread to view, messaging client 220 can determine the shared folder associated with the message thread and present representations of content items in the shared folder on a GUI of the messaging client. The content item representations (e.g., attachment representations) can be presented separately (e.g., externally) from any individual message or message thread. Thus, the user can view any message in the message thread and still view the attachments associated with the message thread in the attachment side bar GUI.

At step 716, user device 210 can send the message, including the link, to the recipients. For example, messaging client 220 can send the message to the identified recipients through a messaging service. Since the attachments are managed by content management system 106, the attachments stored in the shared folder can be synchronized with each recipient device so that when the recipients view the message, the recipients can interact with a local version of the attachments stored on their own devices.

Figure 8:
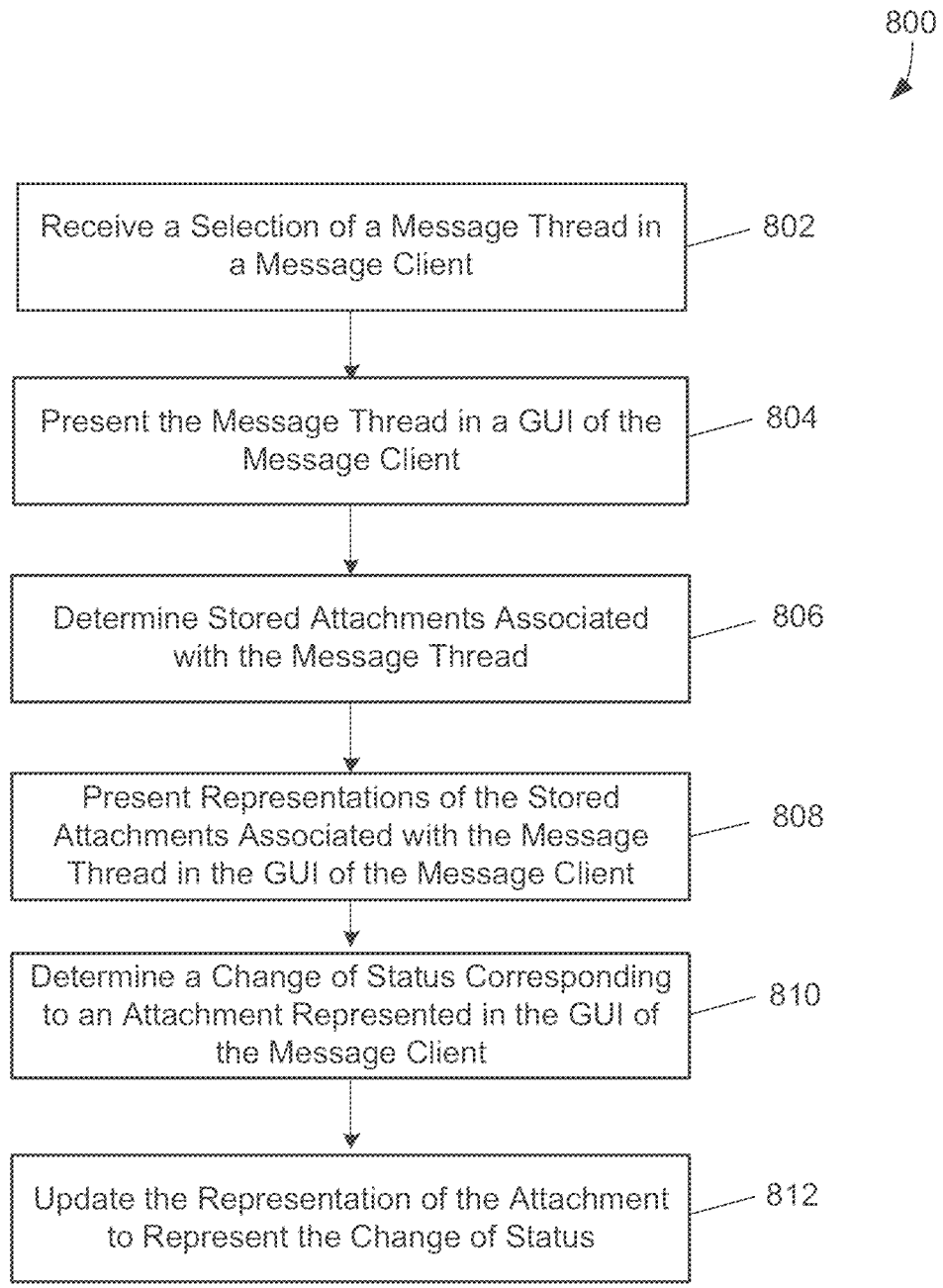
FIG. 8 is a flow diagram of an example process for presenting message attachments in an online a content management system.

FIG. 8 is a flow diagram of an example process 800 for presenting message attachments in an online a content management system. For example, process 800 can be performed by messaging client 220 on user device 210.

At step 802, user device 210 can receive a selection of a message thread in a messaging client. For example, messaging client 220 can present a graphical user interface for presenting electronic messages. The user of user device 210 can select a message or message thread through the graphical user interface to indicate to messaging client 220 which message thread should be presented on the graphical user interface.

At step 804, user device 210 can present the message thread in a graphical user interface of the messaging client. For example, in response to the user selecting the message or message thread, messaging client 220 can present the message thread corresponding to the selected message or message thread on the graphical user interface of messaging client 220.

At step 806, user device 210 can determine the stored attachments associated with the message thread. For example, messaging client 220 can use the message thread identifier to determine stored attachments having metadata (e.g., tags) that include the message thread identifier. Alternatively, messaging client 220 can locate a shared folder associated with the message thread (e.g., using the message thread identifier), and determine the attachments stored inside the shared folder.

At step 808, user device 210 can present representations of the stored attachments associated with the message thread in the graphical user interface of the messaging client. For example, messaging client 220 can present graphical representations of the attachments associated with the message thread separately from the messages in the message thread. Messaging client 220 can, for example, present the representations (e.g., graphical elements) of the attachments in a side bar or other graphical element that is independent of the messages presented in the message thread. Thus, while presenting a message thread message that does not have any attachments, messaging client 220 can still present representations of attachments associated with the message thread. Since the attachments are always presented on the GUI of messaging client 220 (e.g., at least while the corresponding message thread is presented or selected), the attachments are readily accessible to the user and the user has quick access to status information and updates without having to search through the messages in the message thread. The user can select an attachment representation to synchronize the attachment to managed file system 230 on user device 210 and/or open the corresponding attachment from managed file system 230. Alternatively, the user can select an attachment representation to cause messaging client 220 to present a preview image (e.g., static image) of the contents of the corresponding attachment.

At step 810, user device 210 can determine a change of status corresponding to an attachment represented in the graphical user interface of the messaging client. For example, messaging client 220 can receive content item status updates from content management system 106 whenever a user of content management system 106 performs an action with respect to a content item. For example, content management system 106 can monitor content items and determine when a user has opened a content item for viewing, when a user has made changes or edited a content item, when a user has created a new content item, when a new version of a content item has been created, and/or any other type of activity. When any of these activities occur, content management system 106 can send status updates to the user devices (e.g., CMS clients) associated with the content items. Messaging client 220 can determine that a change in status has occurred with respect to an attachment based on these status updates.

At step 812, user device 210 can update the representation of the attachment to represent the change of status. For example, messaging client 220 can update the displayed representations of the content items associated with the currently selected message thread to reflect the status updates determined at step 810. Thus, messaging client 220 can provide a centralized, easy to access, easy to view location on the GUI of messaging client 220 where a user can view and interact with all of the attachments related to the currently selected message thread.

Figure 9A:
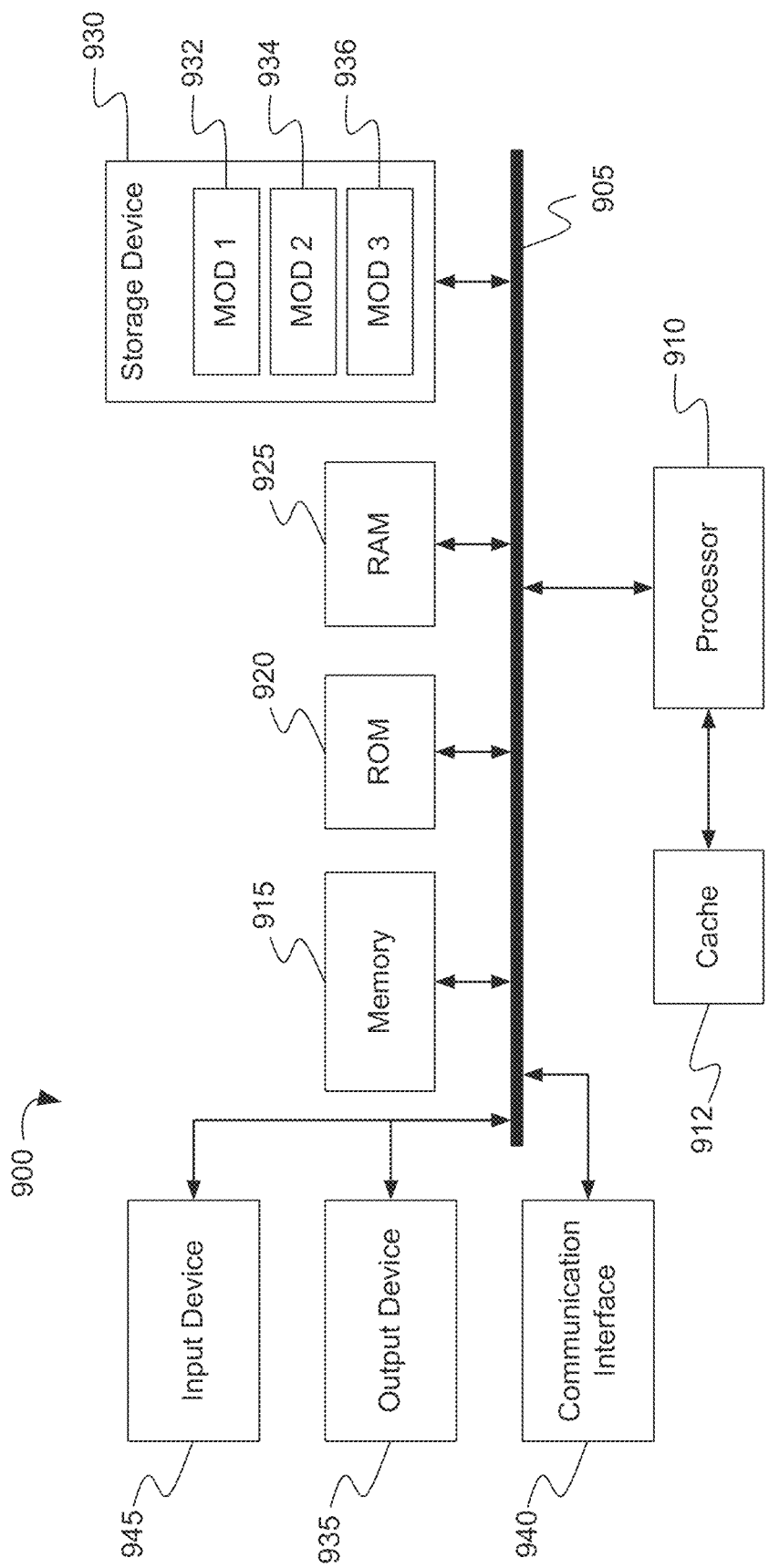
FIG. 9A shows an example possible system embodiment for implementing various embodiments of the present technology.
Figure 9B:
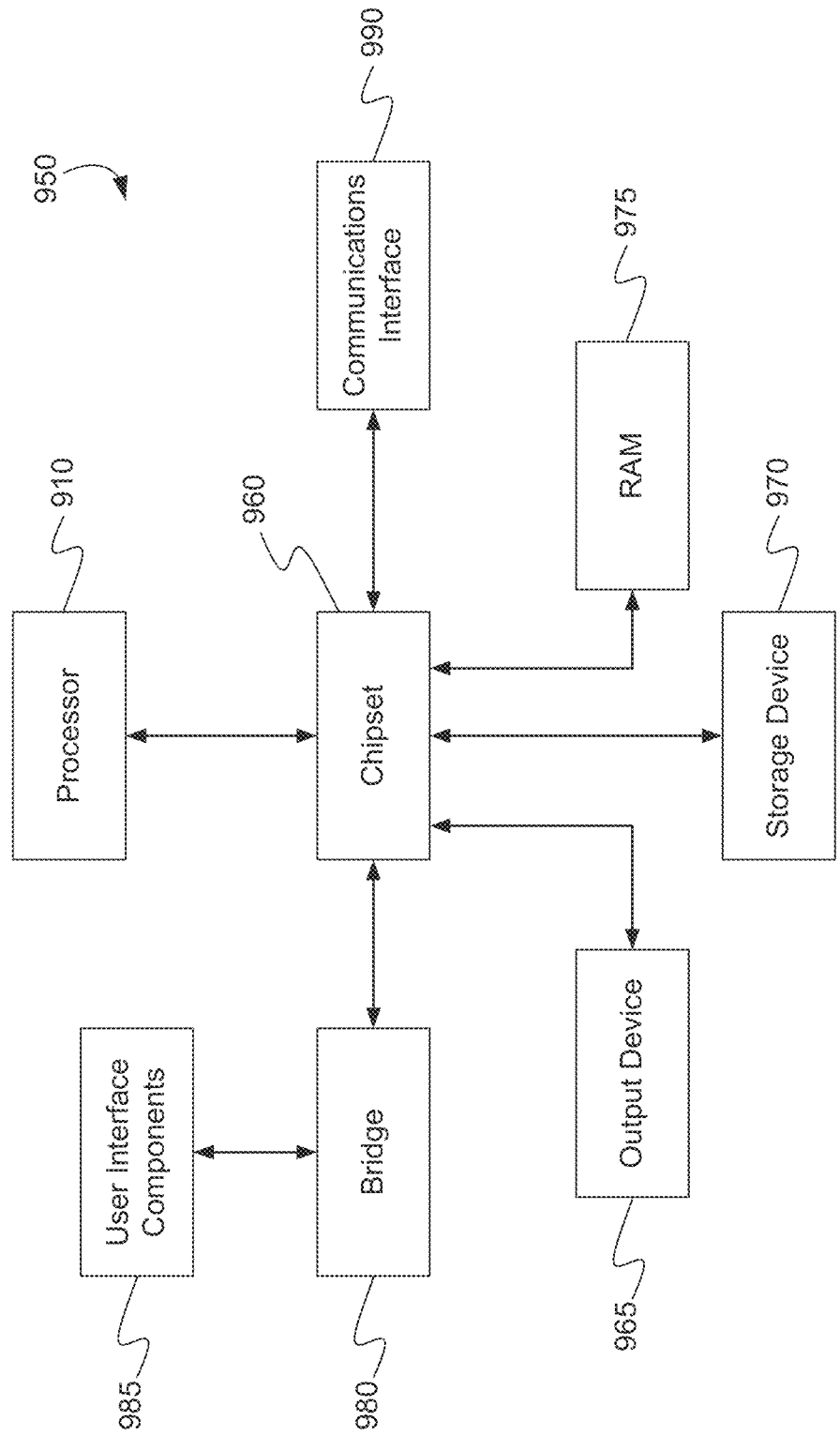
FIG. 9B shows an example possible system embodiment for implementing various embodiments of the present technology.

FIG. 9A and FIG. 9B show example possible system embodiments. The more appropriate embodiment will be apparent to those of ordinary skill in the art when practicing the present technology. Persons of ordinary skill in the art will also readily appreciate that other system embodiments are possible.

FIG. 9A illustrates a conventional system bus computing system architecture 900 wherein the components of the system are in electrical communication with each other using a bus 905. Example system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touchsensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B illustrates a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 910, representative of any number of physically and/or logically distinct resources capable of executing software, firmware, and hardware configured to perform identified computations. Processor 910 can communicate with a chipset 960 that can control input to and output from processor 910. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 910 analyzing data stored in storage 970 or 975. Further, the machine can receive inputs from a user via user interface components 985 and execute appropriate functions, such as browsing functions by interpreting these inputs using processor 910.

It can be appreciated that example systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    presenting, by a computing device, a graphical user interface of an electronic messaging client, the graphical user interface presenting a first message in a first area of the graphical user interface, wherein the first message is to be transmitted from a first user of a plurality of users to other users of the plurality of users;
    receiving, by the computing device, a selection of a content item to attach to the first message, wherein the content item is stored in a file system local to the computing device;
    in response to receiving the selection, storing, by the computing device, the content item in a portion of the file system local to the computing device and managed by a content management system, wherein the portion of the file system managed by the content management system is synchronized with the content management system;
    generating, by the computing device, a link to the content item stored in the portion of the file system managed by the content management system and inserting the link into the first message, wherein the link corresponds to a web-accessible address used to access the content item;
    determining that the first message is associated with a message thread based on a thread identifier;
    identifying at least a second message to the message thread based on the thread identifier;
    determining, based on the thread identifier, a plurality of content items stored in the portion of the file system local to the computing device, wherein the portion of the file system local to the computing device is managed by the content management system; and
    presenting, by the computing device, the first message, a representation of the second message, and a representation of the plurality of content items in the graphical user interface, the representation of the second message comprising a preview of contents within the second message, the representation of the plurality of content items comprising a preview image of the content item that was transmitted to the plurality of users, the preview image comprising content contained in the content item.

2. The method of claim 1, further comprising:
    generating a shared folder corresponding to the content item in the file system; and
    storing the content item in the shared folder.

3. The method of claim 2, further comprising:
    determining one or more recipients of the first message; and
    causing the content management system to share the shared folder with the one or more recipients of the first message.

4. The method of claim 2, further comprising:
    determining one or more recipients of the first message; and
    causing the content management system to synchronize the shared folder with the one or more recipients of the first message.

5. The method of claim 1, further comprising:
    determining one or more recipients of the first message;
    receiving status data indicating an action performed by at least one of the one or more recipients with respect to the content item; and
    presenting the status data with the content item in the graphical user interface of the electronic messaging client.

6. A non-transitory computer-readable medium including one or more instructions that, when executed by one or more processors, cause a computing device to perform operations comprising:
    presenting a graphical user interface of an electronic messaging client, the graphical user interface presenting a first message in a first area of the graphical user interface, wherein the first message is to be transmitted from a first user of a plurality of users to other users of the plurality of users;
    receiving a selection of a content item to attach to the first message, wherein the content item is stored in a file system local to the computing device;
    in response to receiving the selection, storing the content item in a portion of the file system local to the computing device and managed by a content management system, wherein the portion of the file system managed by the content management system is synchronized with the content management system;
    inserting a link to the content item in the first message, wherein the link corresponds to a web-accessible address used to access the content item;
    determining that the first message is associated with a message thread based on a thread identifier;
    identifying at least a second message to the message thread based on the thread identifier;
    determining, based on the thread identifier, a plurality of content items stored in the portion of the file system local to the computing device, wherein the portion of the file system local to the computing device is managed by the content management system; and
    presenting the first message, a representation of the second message, and a representation of each content item in the graphical user interface, the representation of the second message comprising a preview of contents within the second message, the representation of each content item comprising a preview image of content contained in the content item, wherein the content item was transmitted to the plurality of users.

7. The non-transitory computer-readable medium of claim 6, wherein the operations further comprise:
generating a shared folder corresponding to the content item in the file system; and
storing the content item in the shared folder.

8. The non-transitory computer-readable medium of claim 7, wherein the operations further comprise:
determining one or more recipients of the first message; and
causing the content management system to share the shared folder with the one or more recipients of the first message.

9. The non-transitory computer-readable medium of claim 8, wherein the operations further comprise:
causing the content management system to synchronize the shared folder with the one or more recipients of the first message.

10. The non-transitory computer-readable medium of claim 9, wherein the operations further comprise:
receiving status data indicating an action performed by at least one of the one or more recipients with respect to the content item; and
presenting the status data with the content item in the graphical user interface of the electronic messaging client.

11. A system comprising:
one or more processors; and
a non-transitory computer-readable medium including one or more instructions that, when executed by the one or more processors, cause the one or more processors to perform operations comprising:
presenting a graphical user interface of an electronic messaging client;
receiving a selection of a first message in a message thread, the first message sent from a first user of a plurality of users;
presenting the first message in the message thread in first area of the graphical user interface;
determining a thread identifier for the message thread;
identifying at least a second message to the message thread based on the thread identifier;
determining, based on the thread identifier, one or more content items stored in a portion of a file system local to the system, wherein the portion of the file system local to the system is managed by a content management system; and
while presenting the message thread, presenting a representation of the second message, the representation of the second message comprising a preview of contents within the second message and presenting representations of each content item in a second area of the graphical user interface, each of the representations comprising a preview image of content in each content item of the one or more content items, the preview image illustrating content contained in the content item.

12. The system of claim 11, wherein the operations further comprise:
determining that metadata for the one or more content items includes the thread identifier.

13. The system of claim 11, wherein the operations further comprise:
determining a shared folder corresponding to the thread identifier in the file system; and
determining the one or more content items based on content items stored in the shared folder.

14. The system of claim 13, wherein the operations further comprise:
causing the content management system to synchronize the shared folder with one or more recipients of the first message.

15. The system of claim 11, wherein the operations further comprise:
receiving status data indicating an action performed by at least one of one or more recipients with respect to the content item; and
presenting the status data with the content item in the second area of the graphical user interface of the electronic messaging client.

16. The method of claim 1, wherein the content item is associated with a content entry managed by the content management system, the content entry comprising a user account identifier that identifies the first user and multiple user account identifiers corresponding to each other user of the plurality of users with which the content item is shared.

17. The method of claim 1, wherein the thread identifier is a hash values based on characters in a subject line of the first message or the second message.

* * * * *